United States Patent
So et al.

(10) Patent No.: US 7,159,877 B2
(45) Date of Patent: Jan. 9, 2007

(54) GOLF BAG

(76) Inventors: Chin Ho So, 5829 Chambertin Dr., San Jose, CA (US) 95118; Cindy Hi So, 5829 Chambertin Dr., San Jose, CA (US) 95118

( * ) Notice: Subject to any disclaimer, the term of this patent is extended or adjusted under 35 U.S.C. 154(b) by 225 days.

(21) Appl. No.: 10/728,615

(22) Filed: Dec. 5, 2003

(65) Prior Publication Data
US 2005/0121869 A1    Jun. 9, 2005

(51) Int. Cl.
*B62B 1/12* (2006.01)
(52) U.S. Cl. .............. 280/47.26; 280/646; 280/DIG. 6
(58) Field of Classification Search ............ 280/47.26, 280/DIG. 6, 646, 30, 645, 651, 652, 655, 280/47.18, 47.24, 47.17, 654, 659, 35, 47.2
See application file for complete search history.

(56) References Cited

U.S. PATENT DOCUMENTS

| | | | | |
|---|---|---|---|---|
| 1,955,463 A * | 4/1934 | Lathrop | ................ | 206/315.7 |
| 2,508,059 A * | 5/1950 | Burtt | ............ | 280/38 |
| 2,628,801 A * | 2/1953 | Gunning | ............ | 248/96 |
| 2,760,782 A * | 8/1956 | Hartzell | ............ | 280/655 |
| 2,817,538 A * | 12/1957 | Romang | ............ | 280/47.26 |
| 3,150,881 A * | 9/1964 | Van Skyock | ............ | 280/646 |
| 3,900,209 A * | 8/1975 | McDonnell | ............ | 280/655 |
| 4,396,205 A * | 8/1983 | Rosen | ............ | 280/646 |
| 4,455,030 A * | 6/1984 | Rosen | ............ | 280/47.19 |
| 4,648,612 A * | 3/1987 | Park | ............ | 280/47.26 |
| 4,735,425 A * | 4/1988 | Hoff | ............ | 280/47.18 |
| 5,267,750 A * | 12/1993 | Thompson | ............ | 280/646 |
| 6,050,592 A * | 4/2000 | Kim | ............ | 280/652 |
| 6,299,195 B1 * | 10/2001 | Chan | ............ | 280/651 |
| 6,595,356 B1 * | 7/2003 | Homoly | ............ | 206/315.3 |
| 6,758,481 B1 * | 7/2004 | Blomgren | ............ | 280/47.26 |

* cited by examiner

*Primary Examiner*—Christopher P. Ellis
*Assistant Examiner*—Bridget Avery
(74) *Attorney, Agent, or Firm*—Anthony Delas

(57) ABSTRACT

A golf bag having its own wheels for transportation and support is disclosed. The wheels are attached to the back end of the bag by a wheel carrying structure that readily folds for easy carrying and storing, and extends outwardly together with the wheels for transporting the bag and its contents. The structure also serves as a bag stand, thus avoiding the need for separate bag supports. The structure may also be easily separated from the bag and used for other purposes. The bag and the wheel structure are simple in design and inexpensive to manufacture.

9 Claims, 16 Drawing Sheets

GOLF BAG

BACKGROUND OF THE INVENTION

1. Field of the Invention

The invention relates generally to the golf industry and more specifically to a golf bag and a method of transporting a golf bag. This novel approach combines a golf bag for carrying golf clubs and similar equipment with a transportation cart that also functions as a golf bag stand, thus eliminating the need for a separate golf bag stand. The invention described herein may also be employed in transporting other similarly shaped objects.

2. Description of Related Art

The game of golf continues to increase in popularity. The game requires golfers to employ a variety of specialized equipment: golf clubs, golf bag for storing and transporting golf clubs, shoes, golf balls, divot tools, etc. All this equipment makes a golf bag a heavy and cumbersome device to transport. Usually, a golfer carries a golf bag by picking up a handle or by utilizing a shoulder strap that enable a golfer to carry a bag over a golf course. However, a golf bag containing several golf clubs added to its own weight is very heavy, and considering the size of a typical golf course, a golfer would grow quite tired by carrying a golf bag during a typical game.

Typical golf bag shown in FIG. 1 has the bag body, partitions providing for golf club placement, and golf bag stands.

An additional problem is created by the need to support a bag while a golfer is actually playing and keep it from falling on the ground. This problem is usually solved by supporting a golf bag at its rim with two extendable stands. The stands need to be brought back to their rest position every time a golfer moves along a golf course and extended again to support a bag every time a golfer is ready to play.

In order to move a heavy golf bag across a golf course, variety of transportation devices, generally of manual pull-cart type have been employed for this purpose. Typically, a cart and a bag are separate units. This of itself requires additional handling while transporting the two to and from a golf course. A typical pull cart is quite heavy, bulky and time consuming to use with a golf bag. The added weight comes from the framework built to rest and attach a golf bag. The framework likewise makes a typical golf bag quite bulky and inconvenient to use. This process involves loading a bag onto a cart, strapping or otherwise attaching it to the cart and pushing or pulling it along the golf course. The straps also need to be kept in good condition as they can easily get snagged by the trees or other vegetation. A golf bag and a cart also need to be stored at and transported from player's home to a golf course and back. This poses additional difficulties as both devices tend to be bulky and cumbersome to move. A large storage area is required at player's home and a car with a large trunk or passenger compartment is needed for transportation. Additionally, the manufacturing cost of a golf bag and a complicated golf cart are unnecessarily high. Typical golf bag cart is shown in FIG. 2 and FIG. 3.

A typical golf bag transportation device is described in U.S. Pat. No. 6,561,527, Hybrid Golf Bag Technology, wherein a wheel mount is attached to the bottom of the golf bag. While this method provides for relatively easy golf bag movement, the wheels and the bag do not form an integral part and the bag still needs to be supported in its stationary position, thus requiring that separate support stands be employed.

U.S. Pat. No. 6,425,589, Golf Bag Functioning As A Golf Cart and a Foot Stand, attempts to integrate bag transportation mechanism employing dismountable wheels and a bag stand. While this approach meets its basic design function, the transport structure is very complicated requiring primary and secondary supports, retaining elements, cylindrical posts, etc., and the wheels have to be manually removed from their installed positions and stored inside a compartment for a shoulder carry position. The added weight and cost of this complicated structure are its additional disadvantages.

U.S. Pat. No. 6,554,299, Detachable Wheels for a Golf Bag, describes a golf bag which is adopted to receive a pair of detachable wheels at the bottom of the bag. While the device enables bag transportation, it fails to provide solid support for the bag in its standing position. Another limitation of this design is that the wheels have to be very small in order to conform to the bag bottom, thus further compromising the bag stability in stationary or moving position.

U.S. Pat. No. 6,598,889, Golf Bag Cart, is similar in its approach to the U.S. Pat. No. 6,554,299 and the bag still requires separate support stands.

U.S. Pat. No. 6,511,025, Golf Bag Retaining Device, does not address bag transportation issue but only the support it in its stationary and generally upright position.

U.S. Pat. No. 6,557,482 describes a Pull Cart. This cart may be adopted to transport a golf bag. The structure is quite complex, large and it requires that a bag be fastened to the cart.

U.S. Pat. No. D 468,098, Combination Inner Shell of Golf Bag and Golf Cart, provides for the bag transportation and support in rest position with a wheel structure that folds into the bag body when not in use.

U.S. Pat. No. D 482,170, Double Rails Golf Cart, is a stand alone unit separate from a golf bag. It requires that a bag be loaded onto it and occupies large area whether in storage or in a vehicle.

U.S. Pat. No. 6,431,563, Golf Bag Cart describes a stand alone cart that is fixed to a bag via bolts and rivets. While an improvement over some of the other patents mentioned it is still a complex and difficult to manufacture device.

A typical integrated bag and cart device encountered in some of the prior art is a very complex unit. Usually, a device of this type includes a bag adopted for receiving several golf clubs, upper and lower fixation members fixed to the bag, and a support detachably coupled to the upper and lower fixation members at its upper and lower ends. A pair of leg members are coupled to the support at their ends via a first bracket such that they can be rotated with a predetermined angle with respect to each other. Wheels are coupled to the opposite ends of the leg members such that they can be rotated. A holding handle is coupled to an upper portion of the support at its one end via a second bracket such that it can be rotated. A pair of link members are coupled to the holding handle at their one ends and to the leg members at their opposite ends such that they can be rotated. A locking member is provided in the holding handle to detachably fix the holding handle to the upper fixation member while keeping the outstretched state of the leg members to be constant.

In this type of cart when the holding handle is elevated while rotating around the second bracket, the link members are operated to thereby rotate the leg members around the first bracket and outstretch them. When the leg members are completely outstretched, the locking member of the holding handle is inserted into a locking groove formed at the upper fixation member to keep the outstretched state of the leg members to be constant. In order to fold the holding member and the leg members, it is necessary to release the locking state of the locking member and rotate the holding handle around the second bracket to thereby descend it. At this time, the leg members are rotated downwards and adhere to the bag.

A cart as described above, involves complicated structure that makes it difficult for the user to handle in a convenient way. Furthermore, the cart like this cannot easily move while keeping the folded state of leg members to be constant. Particularly, the cart cannot move easily in a narrow place with the outstretched leg members.

Furthermore, since the holding handle or the shoulder string for picking up and carrying the cart is positioned on the front surface of the bag opposite to the surface sided with the leg members, the leg members are likely to be swayed or outstretched due to their own weight, causing inconvenience or even safety problems.

Most of the golf bags and carts described above are complicated, cumbersome and expensive to manufacture. For these reasons there is a need for an improved golf bag with and integrated cart that does not need a separate support stands, is simple to use, occupies minimal space and is inexpensive to manufacture. The golf bag invention described here meets these requirements.

SUMMARY OF THE INVENTION

A golf bag of the present invention includes a bag of sufficient size with different compartments to house golf clubs, shoes and other items particular to the game of golf, a cart structure for transporting the bag along the golf course, and a handle located at the rim of the golf bag. The cart is connected to the bag at a reinforced section of the bag for better support. The cart employees an external arm that rotates at the point of connection of the golf bag so that it can be locked in place when in its rest position and parallel to the bag for easy transportation or storage, or at a 90 degree angle to its rest position for moving the bag along the golf course. Attached by means of a lock-hinge to each end of the external arm is a wheel support that folds and locks inwardly onto the external arm when in its rest position and outwardly and away from the external arm to a 90 degree angle relative to the bar when in bag transportation position. A wheel is attached to the free end of each wheel support enabling easy transportation along the golf course. When the golfer wants to transport the bag on his shoulder or a vehicle, he simply folds the wheel supports inward onto the external arm, turns the arm 90 degrees and the arm locks itself in this position. A cover is conveniently supplied to drape over the arm and wheel structure. A telescoping handle extends from the inner space of the bag and terminates at the rim of the bag. The handle then extends further for easier transportation as needed.

It is an advantage of the present invention to provide a golf bag with an integrated transportation structure.

It is another advantage of the present invention to provide a golf bag with a simple transportation structure.

It is yet another advantage of the present invention to provide a golf bag that can be easily converted from its rest position to being ready to transport along the golf course.

Yet another advantage of the present invention is that eliminates the need for separate golf bag support stands.

Still another advantage of the present invention is to manufacture the transportation structure from low cost and lightweight materials.

A further advantage of the present invention is that it does not need separate support stands.

The features, benefits and advantages of this invention will of this invention will become clear by reference to the following description, the drawings and the appended claims.

DETAILED DESCRIPTION

Figure 1:
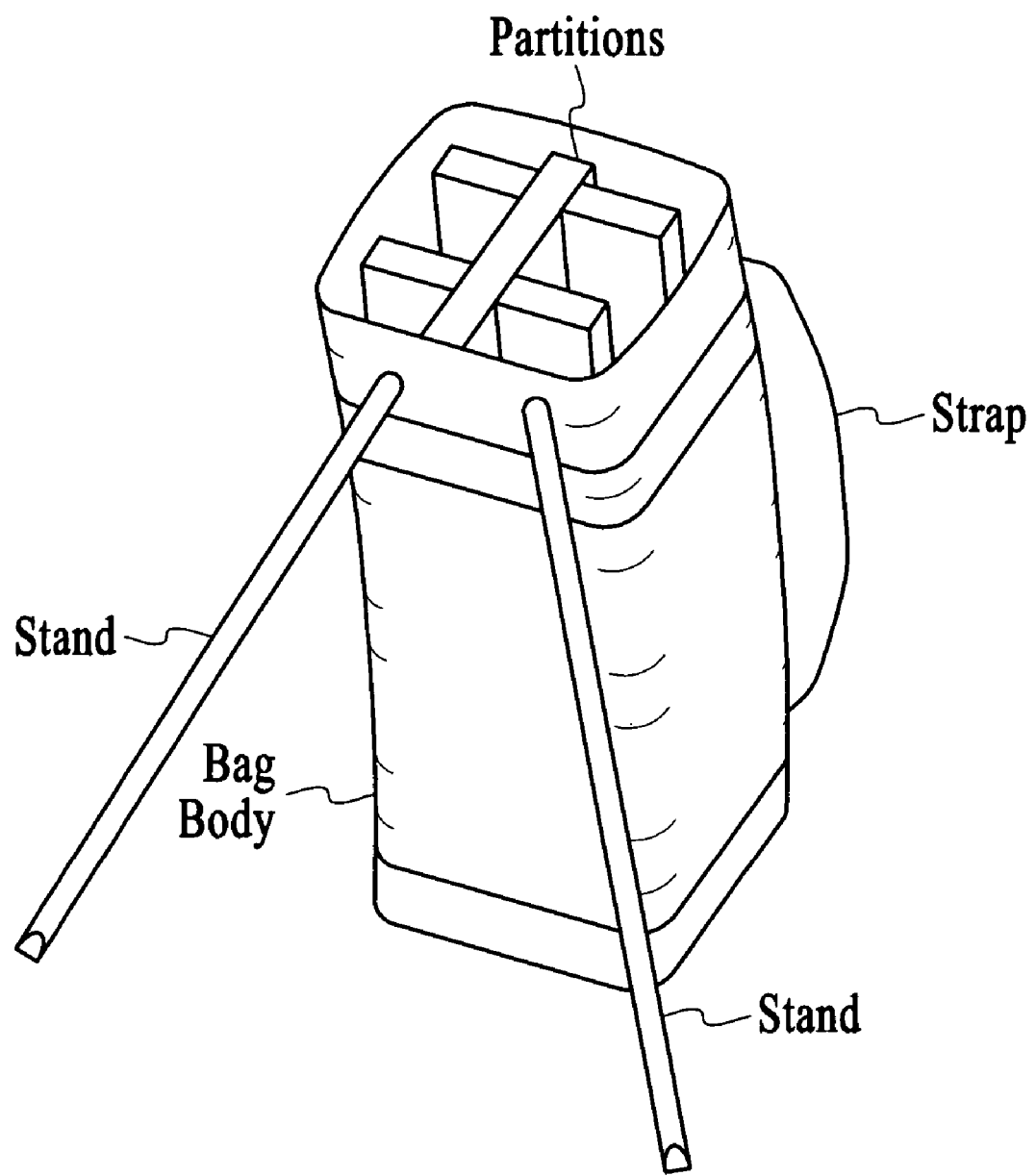
FIG. 1 is a panoramic view of a typical golf bag of prior art in its standing position.
Figure 2:
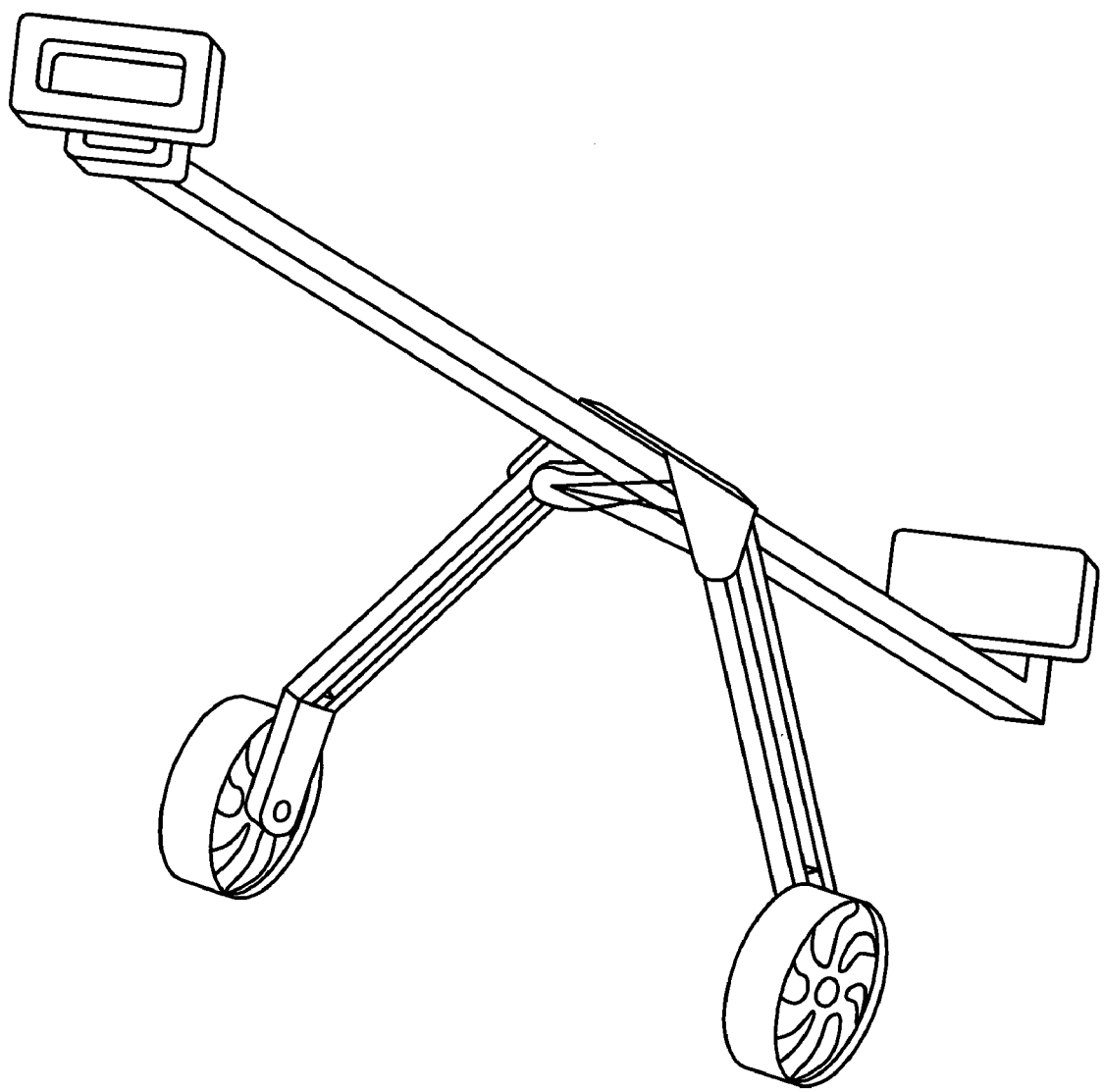
FIG. 2 shows a typical golf bag support cart.
Figure 3:
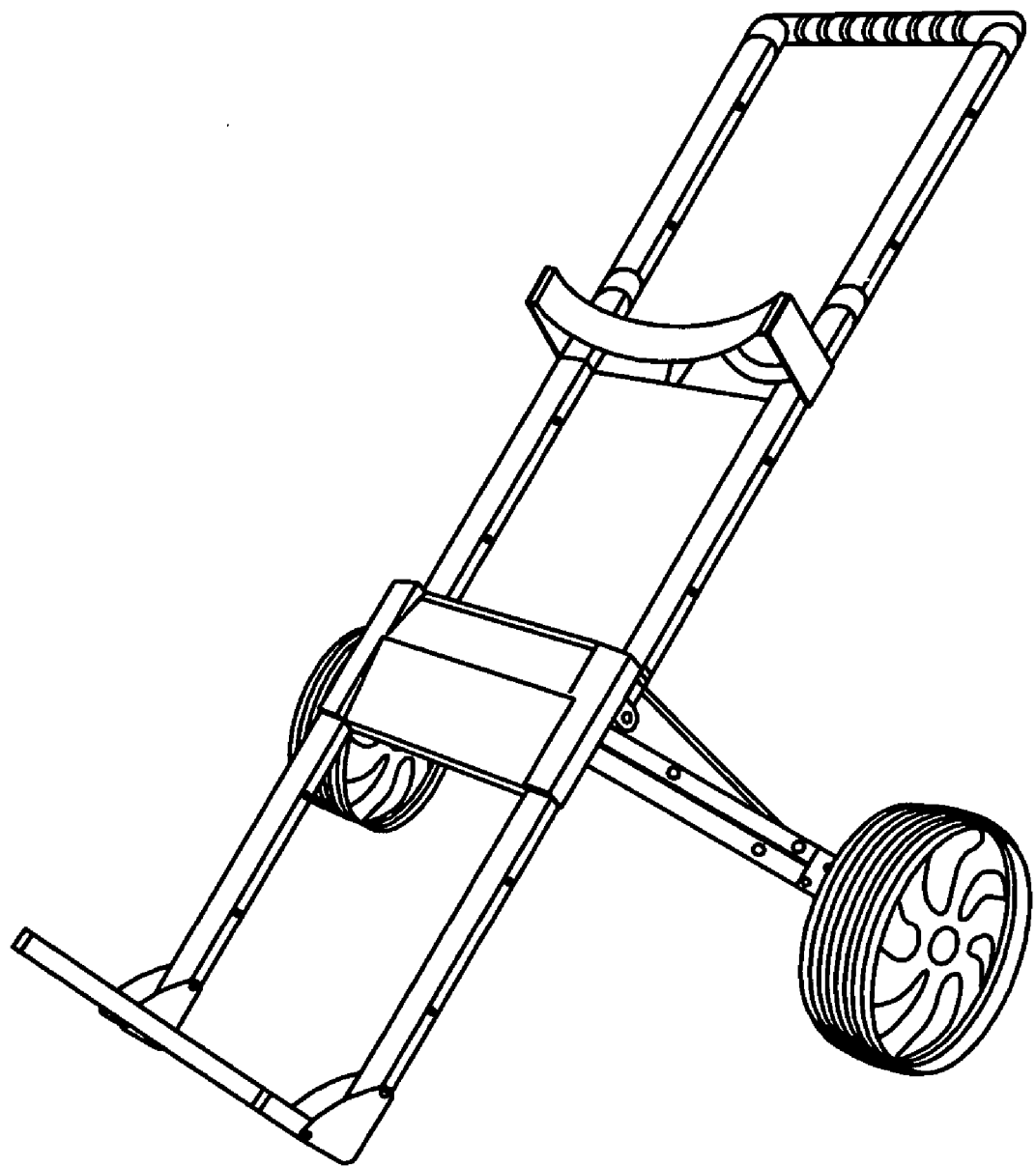
FIG. 3 shows another version of a golf bag and a cart.
Figure 4:
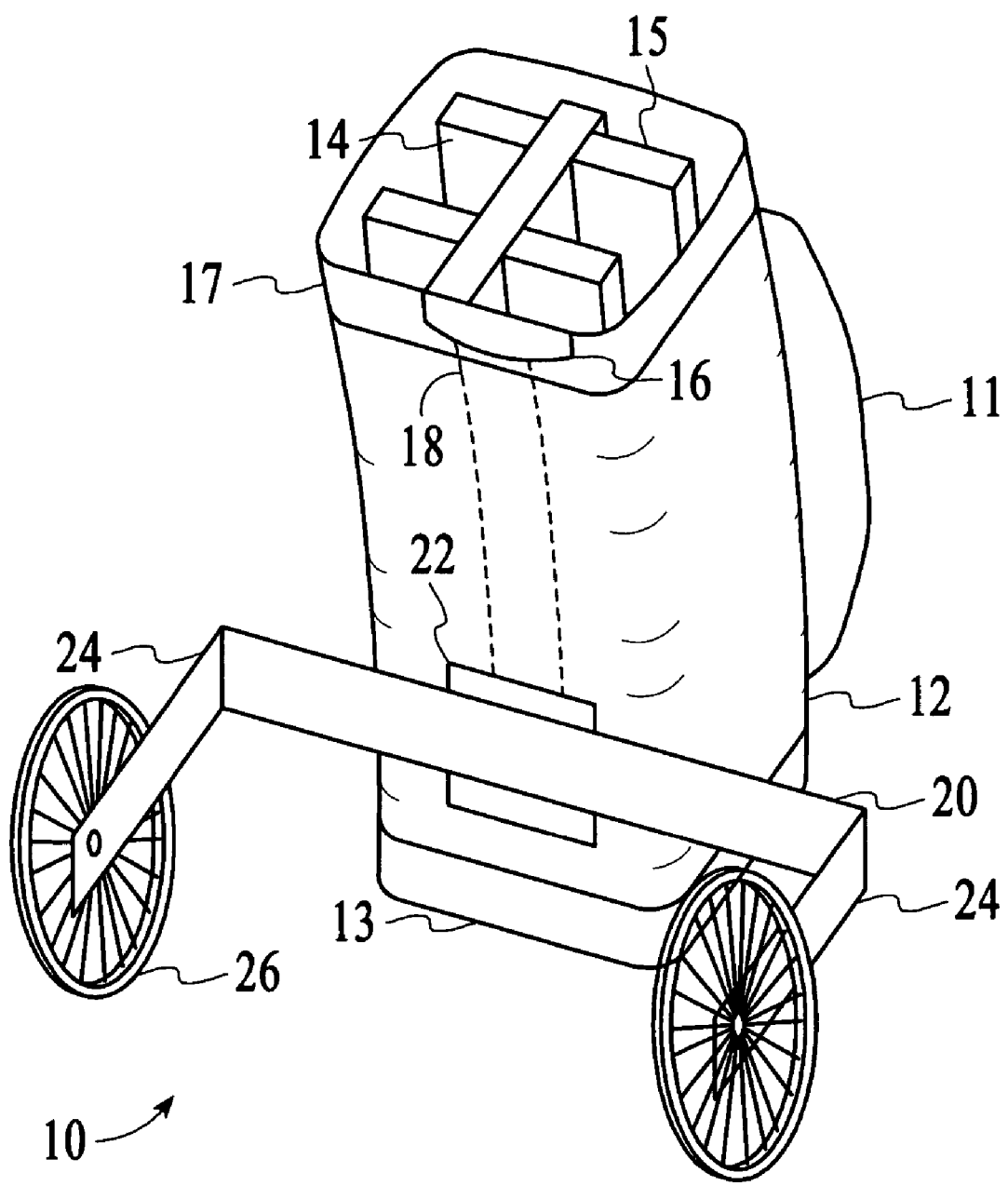
FIG. 4 is a panoramic view of the back of the golf bag of the present invention with the wheels extended for using the golf bag on the golf course.

Turning to FIG. 4 of the present invention, the golf bag 10 includes the bag body 12 with an inner space 14 sectioned by the partitions 15 to accommodate golf clubs, handle 16, handle extension 18, external arm 20, reinforced region 22 of the bag wall 12, wheel support members 24 for supporting the wheels 26, closed bottom 13 and a carrying strap 11. The reinforced region 22 may be an external object sewn or attached by other means to the bag body 12, or it may be accomplished by making that portion of the bag wall 12 stronger, or it may extend partially or fully the length of the bag 10 or be an integral part of the bag 10, or the entire wall 12 may be of sufficient strength on the side coupling with said external arm 20 that said reinforced region 22 is not required. The wheels 26 may be attached to the leg members 24 by a number of readily commercially available means that allow wheels 26 to rotate, such as pins, bolts, screws, axles, etc. The wheels 26 may be conveniently sized to support the bag 10 at a desired angle when resting or traveling. The bag would also have typical compartments for storing items a golfer would usually require during a game.

Figure 4A:
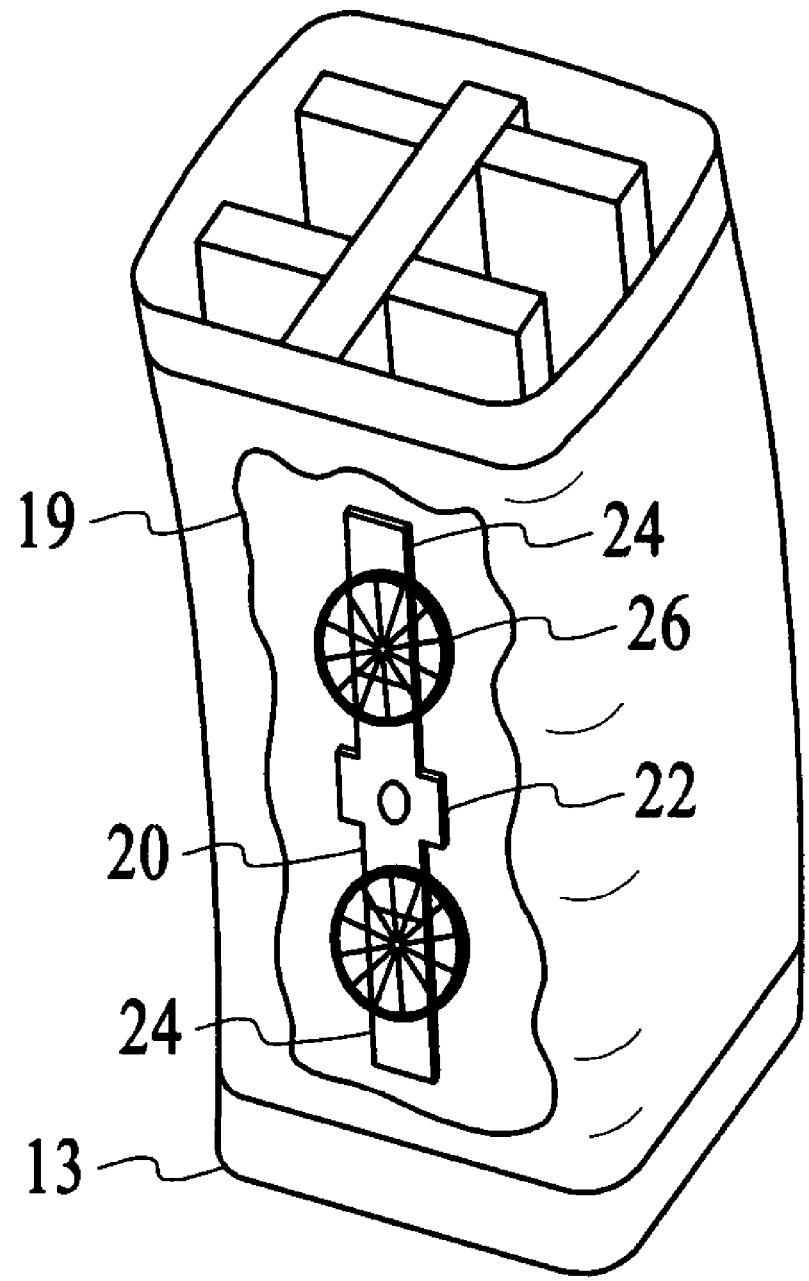
FIG. 4A is the back view of the golf bag with the wheels folded inward for carrying or storing the golf bag.

Shown in FIG. 4A is the back view of the golf bag 10 with external arm 20 rotated so that it is parallel to the bag 10 and the wheel supports 24 folded inward so that they rest upon external arm 20. Also shown is the compartment 19, preferably zippered, for housing the reinforced region 22, the external arm 20, the wheel supports 24 and the wheels 26.

Figure 5:
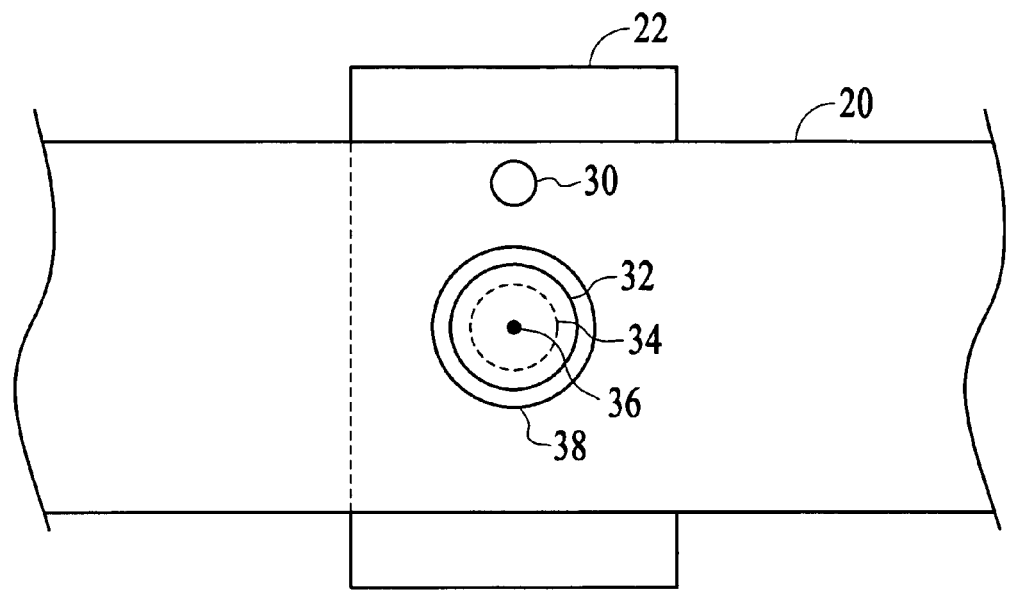
FIG. 5 shows the connection between the reinforced region and the external arm.

FIG. 5 shows one approach to attaching the external arm 20 to the reinforced region 22. An extension of generally round, cylindrical or conical shape 34 protrudes from the reinforced region 22. The external arm 20 has a hole 32 in its center. The diameter of the hole 32 is slightly greater than the diameter of the extension 34 and its height is also slightly greater than the thickness of external arm 20. The extension 34 also has a hole in its center to accommodate a fastener 36. Preferably, the fastener 36 is a screw, but any suitable fastener may be employed. A spacer 38 with a countersunk hole in it is inserted between the external arm 20 and the screw. This allows the screw 36 to secure the external arm 20 to the reinforced region 22. Since the height of the extension 34 is greater than the thickness of external arm 20, there will remain a space between arm 20 and spacer 38 sufficient to allow arm 20 to rotate freely around the extension 34. Alternatively, the external arm 20 may be affixed to the reinforced region 22 by permanently attaching the spacer 38 to the extension 34. The external arm 20 may be of any geometric shape so long as it can be attached to the reinforced region 22. Preferably, the external arm 20 is rectangular.

The arm 20 moves between two positions. In the first position, suitable for carrying and storing the bag 10, the arm 20 is parallel to the bag body 12. In the second position, suitable for transporting golf clubs during play, preferably, the arm 20 is approximately perpendicular to the bag wall 12. Other angles are also possible. The plunger 30 locks the arm 20 in each of the two positions described. A person skilled in the art may find other ways of properly positioning the arm 20 relative to the bag wall 12.

Figure 5A:
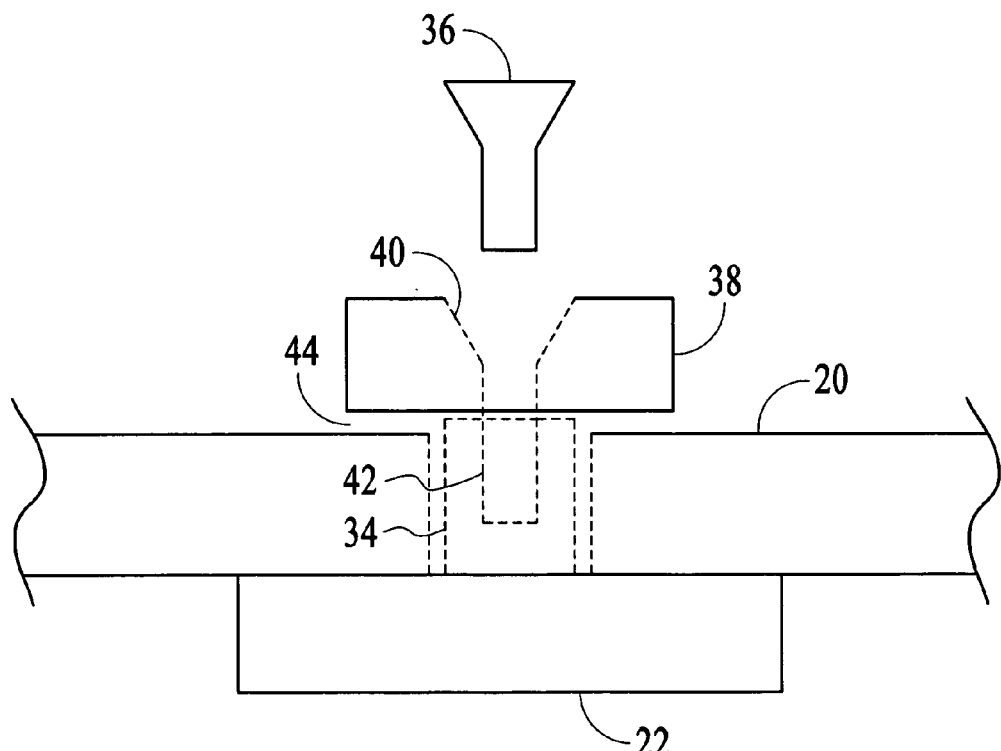
FIG. 5A shows the front view of the connection between the reinforced region and the external arm.

Shown in FIG. 5A is the front view with the golf bag in horizontal position and showing the arm 20, the reinforced region 22, the extension 34, the hole 42 in the extension 34 for receiving the fastener 36, the spacer 38 and the countersunk opening in spacer 38 for receiving the fastener 36. The space 44 between the spacer 38 and arm 20 allows the arm 20 to rotate around the extension 34.

Figure 6:
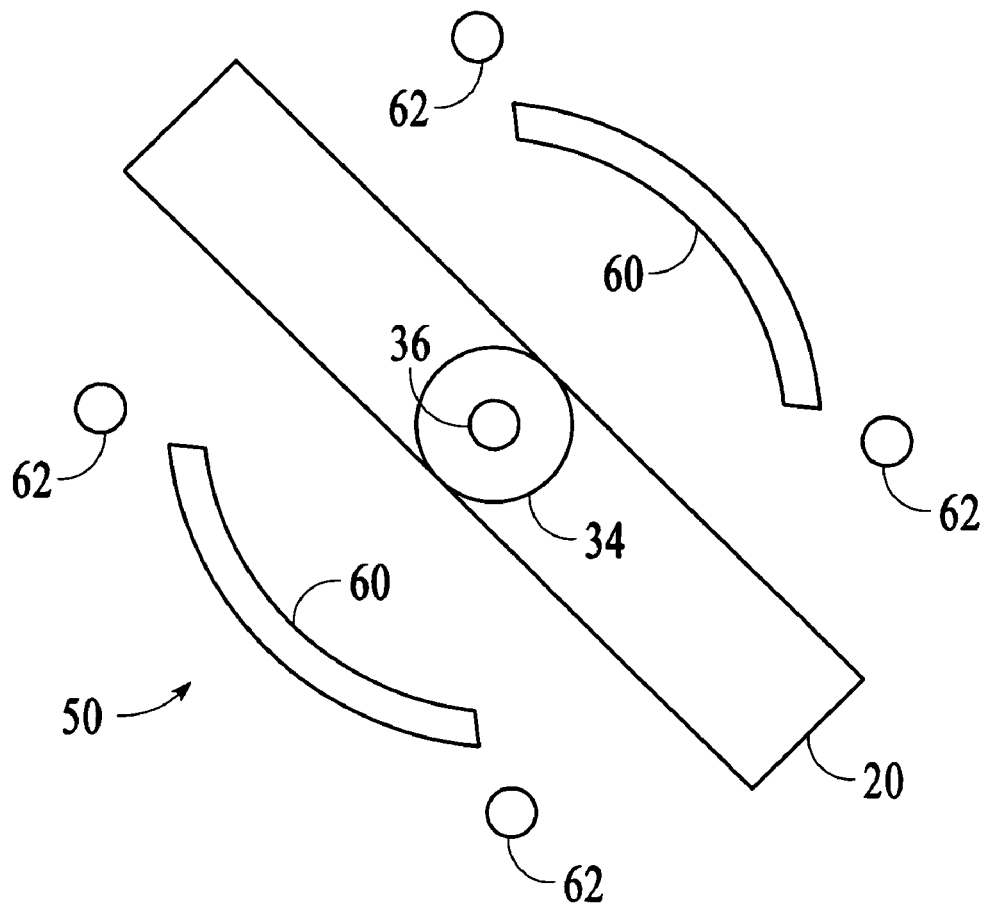
FIG. 6 is top view of the connection detail of the reinforced region. is a front view of the section shown in FIG. 5.

The detail of how the rotation of the arm 20 is controlled is shown in FIG. 6. Arm 20 rotates around the extension 34 of the reinforced region 22 and is fastened to the extension 34 by the screw 36. The travel control detail 50 preferably has two channels 60 positioned in the reinforced region 20. The length of channel 60 is approximately 90 degrees. The channel 60 serves to guide the arm 20 as it travels between its storage position and the golf bag transportation position. The channels accommodate pins 72 seen in FIG. 8 that help guide the arm 20 to different positions relative to the reinforced region 22. The rotation may also be accomplished without any channel 60 or only with channel 60 and with only one pin 72 or with no pins 72 at all. It is preferred to have at least one channel 60 for smoother rotation and to more positively determine travel end points. It is also preferred to have at least one pin 72. The actual length of channel 60 may be longer than 90 degrees if desired but in that case the stops would be controlled only by spring plunger 74 shown in FIG. 8. When plunger 74 is in its retracted position the arm 20 rotates freely. The partial or through depressions 62 in the reinforced region 22 are positioned to receive the tip 84 of spring plunger 74. The spring plunger 74 stops the rotation of arm 22 by mating with depressions 62. At this point in rotation of arm 20 the plunger 74 is in its extended position and enters the holes 62. At least two depressions 62 are needed, one to stop the rotation of arm 20 in its rest position and one to stop the arm 20 in its golf bag transport position. Other types of plungers 74 may also be employed and, like plunger 74, are generally available commercially.

Figure 7:
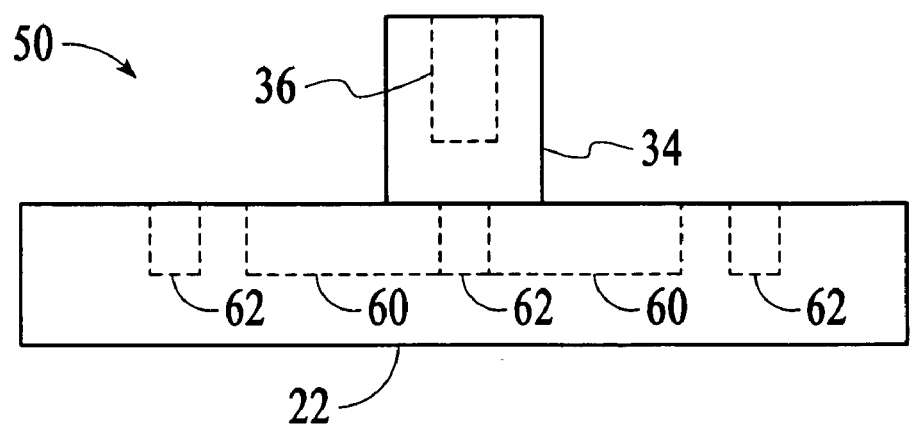
FIG. 7 is a front view of the reinforced region of FIG. 5

FIG. 7 shows the front view of the reinforced region 22. Shown are channels 60, the holes 62, the extension 34 and the corresponding screw 36 for aiding fastening the arm 20.

Figure 8:
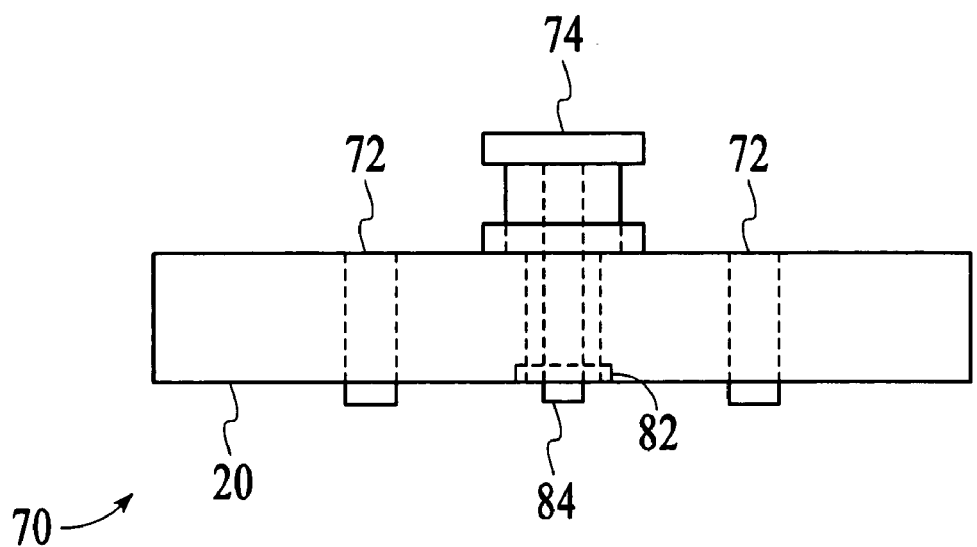
FIG. 8 shows the front view of area of the external arm that connects to the reinforced region.

Shown in FIG. 8 is the front view of the arm 20 including pins 72 that guide arm 20 through channels 60, plunger 74 and the retainer 82.

Figure 9:
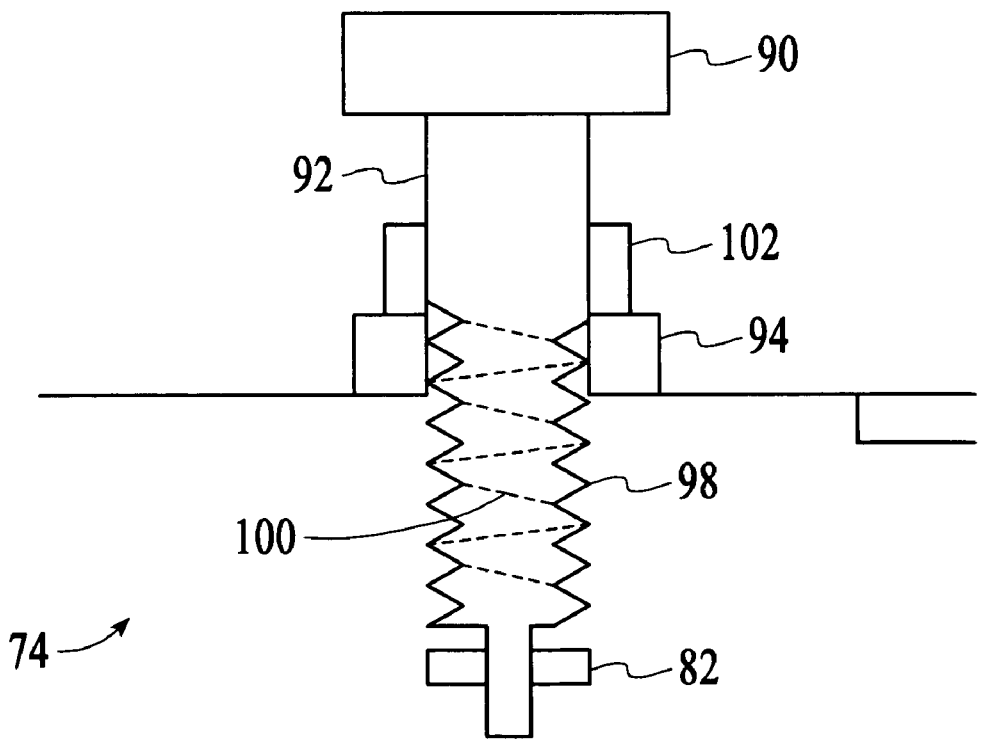
FIG. 9 is the cross section of the plunger shown in FIG. 8.

The detail of the spring plunger 74 is shown in FIG. 9. where the plunger 74 having a rest position and retracted position, includes the shaft 92, the head 90, the threaded portion 98, the retaining nut 94, the retainer 82 and the spring 100. Pulling on the head 90 of the plunger 74 causes the shaft 92 to retract from the hole 62 making it possible to rotate the arm 20. Similarly, releasing the plunger 74 causes the tip 84 to couple with the hole 62 due to downward pressure of spring 100 and stopping the rotation of the arm 20. Preferably, the plunger 74 has locking capability. Turning the plunger about 90 degrees when in its retracted position allows the plunger to rest on spacer 102. This enables a smooth rotation of arm 20. Releasing the plunger 74 back to its rest position locks the arm 20 in its new position. Other types of commercially available plungers would also satisfactorily perform this function.

Figure 10:
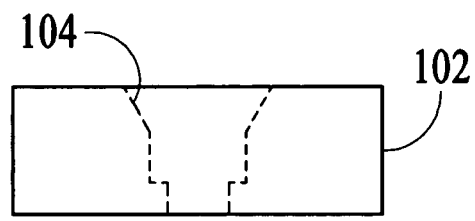
FIG. 10 is the front view of the spacer employed to assist attachment of the cart to the golf bag.
Figure 11:
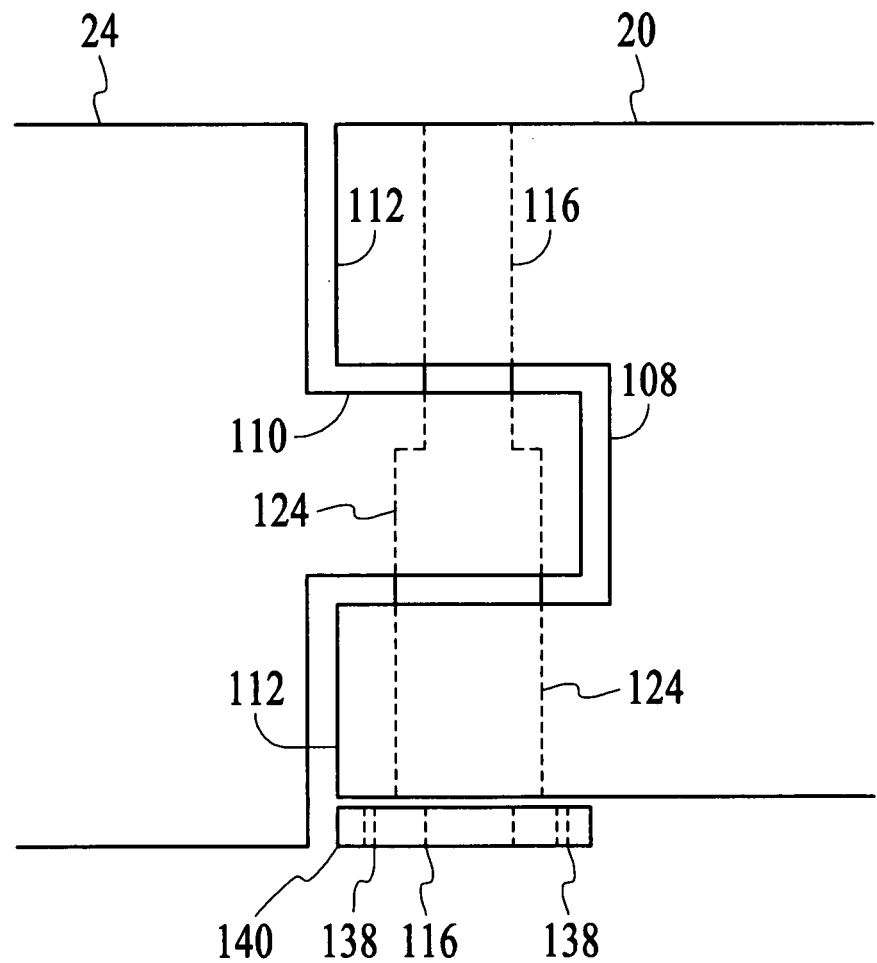
FIG. 11 shows the connection between the arm section and the wheel supports.

FIG. 10 is the front view of the spacer 102 and the counter sunk hole 104 used to fasten the arm 20 to the reinforced region 22. The spacer 102 is placed on top of the extension 34 and secured with the screw 36.

Figure 12:
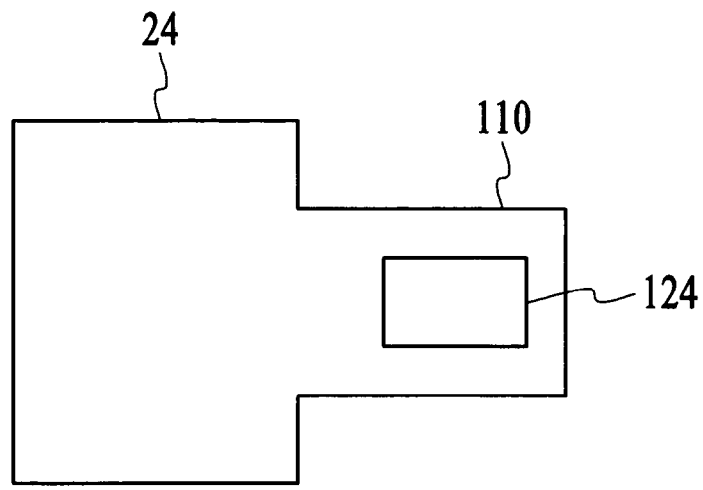
FIG. 12 shows further detail of the outreaching portion of wheel support of FIG. 11.
Figure 13:
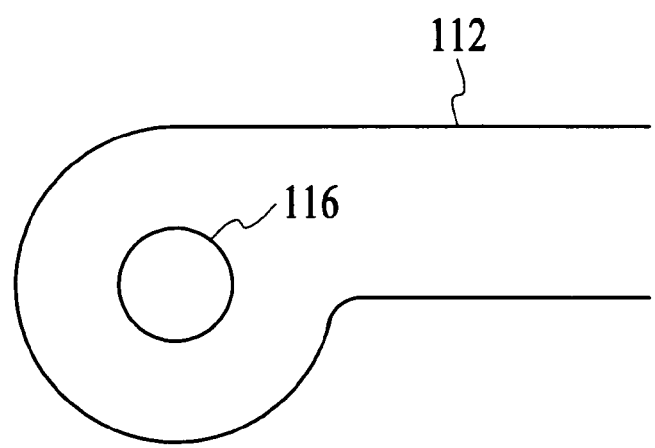
FIG. 13 is top view of the upper outreaching portion of the external arm that connects to the wheel support with a hinge.
Figure 14:
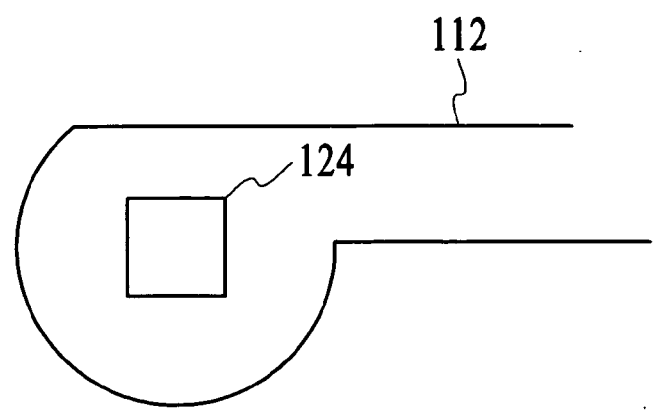
FIG. 14 shows the top view of the outreaching portion of wheel support that connects to external arm with a hinge.

FIGS. 11 through 16 show the details of securing wheel supports 24 to arm 20. A person skilled in the art will find many ways of enabling this connection. Preferably, the connection is lockable in two positions, first with wheel supports 24 fully folded inward towards the center of arm 20 and second position at about 90 degrees to the arm 20. The first position facilitates easy carrying of the bag 10, while the second position allows the wheels 26 to roll on the ground and transport the bag 10. One way to enable the connection between the arm 20 and wheel supports 24 is to manufacture the mating portions of the two structures so that the arm 20 has two in-reaching portions 108, one on each end, bounded by upper and lower outreaching portions 112, and the wheel supports 24 have one out-reaching portion 110 that fits between the two outreaching portions 112. If a locking hinge, as used in this invention, will be employed, a round hole 116 is made through one of the outreaching portions 112 on each end of arm 20 and a square hole 124 is made in the opposite out-reaching portion 112 on each end of the arm 20 and in the in reaching portion 110 of wheel supports 24. FIG. 12 shows the square hole 124 in the outreaching portion 110 of wheel support 24. FIG. 13 shows the round hole 116 drilled in top outreaching portions 112 of the arm 20, and FIG. 14 shows the top vies of square hole 124 made in the lower outreaching portion 112 of arm 20. The portions 110 and 112 are mated together allowing for easy insertion of lockable hinge or similar device through portions 112 and 110.

Figure 15:
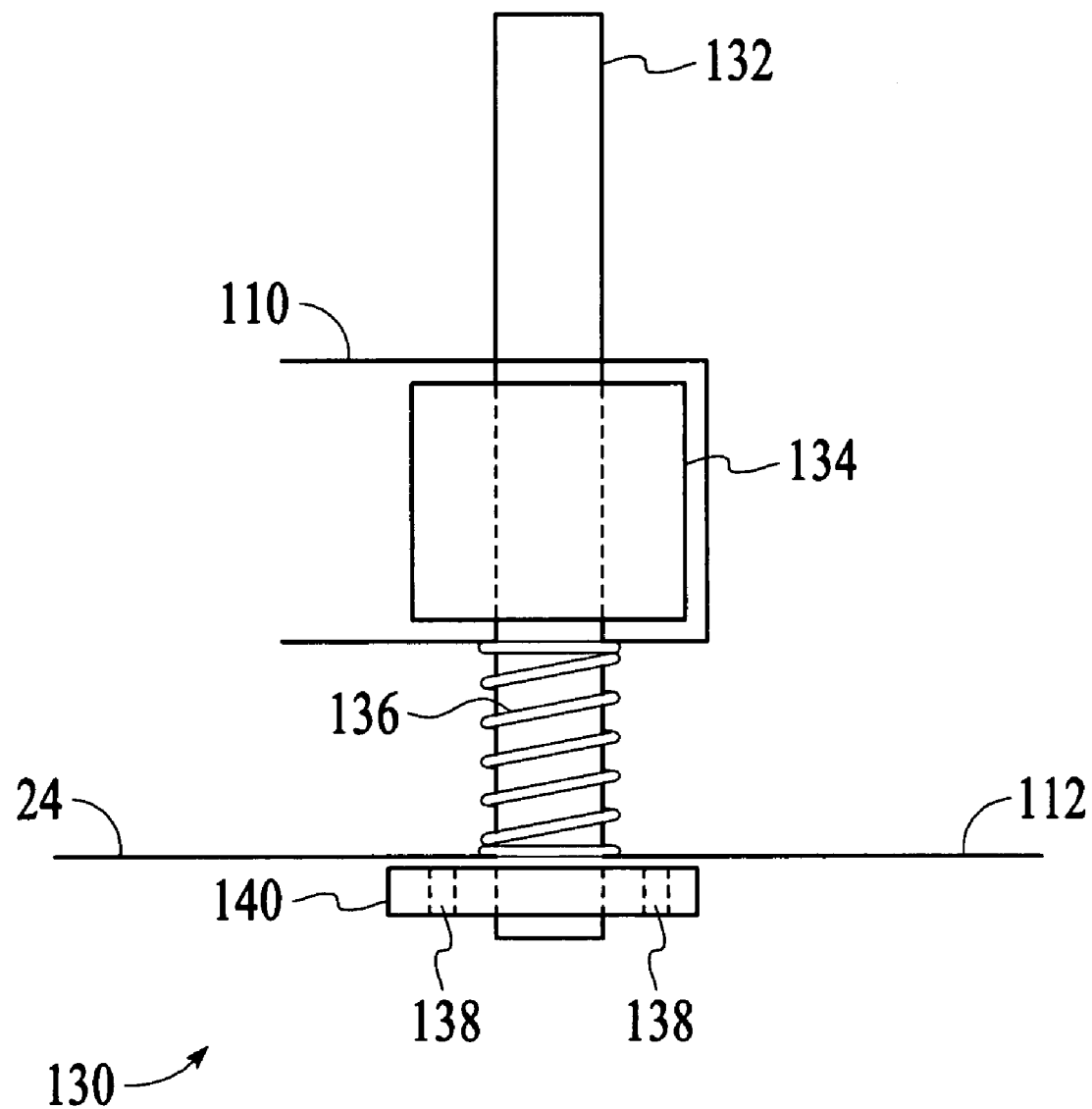
FIG. 15 shows the detail of the lockable hinge.

The lockable hinge 130 is shown in FIG. 15 where, 132 is the hinge body, 134 is the locking section, 136 is the spring, 138 are fastener holes an 140 is the securing plate that is fastened to the lower outreaching portion 112 of the arm 20 by screws or other fasteners. When the hinge 130 is inserted through portions 112 and 110, the locking section 134 of the hinge 130 rests partially in the hole 124 of the portion 110 and partially in the hole 124 of the lower portion 112 adjacent to the securing plate 140. In this position the wheel support 24 is locked in place. Pressing down on the hinge body 132 overpowers the spring 136 and pushes the locking section 134 into the hole 124 of the lower outreaching portion 112 adjacent to the securing plate 140. Since the outreaching portion 110 is no longer connected by the locking portion 134 to the lower outreaching portion 112, the wheel supports 24 are now free to rotate between the position substantially vertical to arm 20 for purposes of transporting the bag 10, or rotated inward towards the center of the arm 20 for easy storage and carrying of the bag 10. Other versions of hinge arrangements are also possible, such as a door type of hinge or a similar device.

Figure 16:
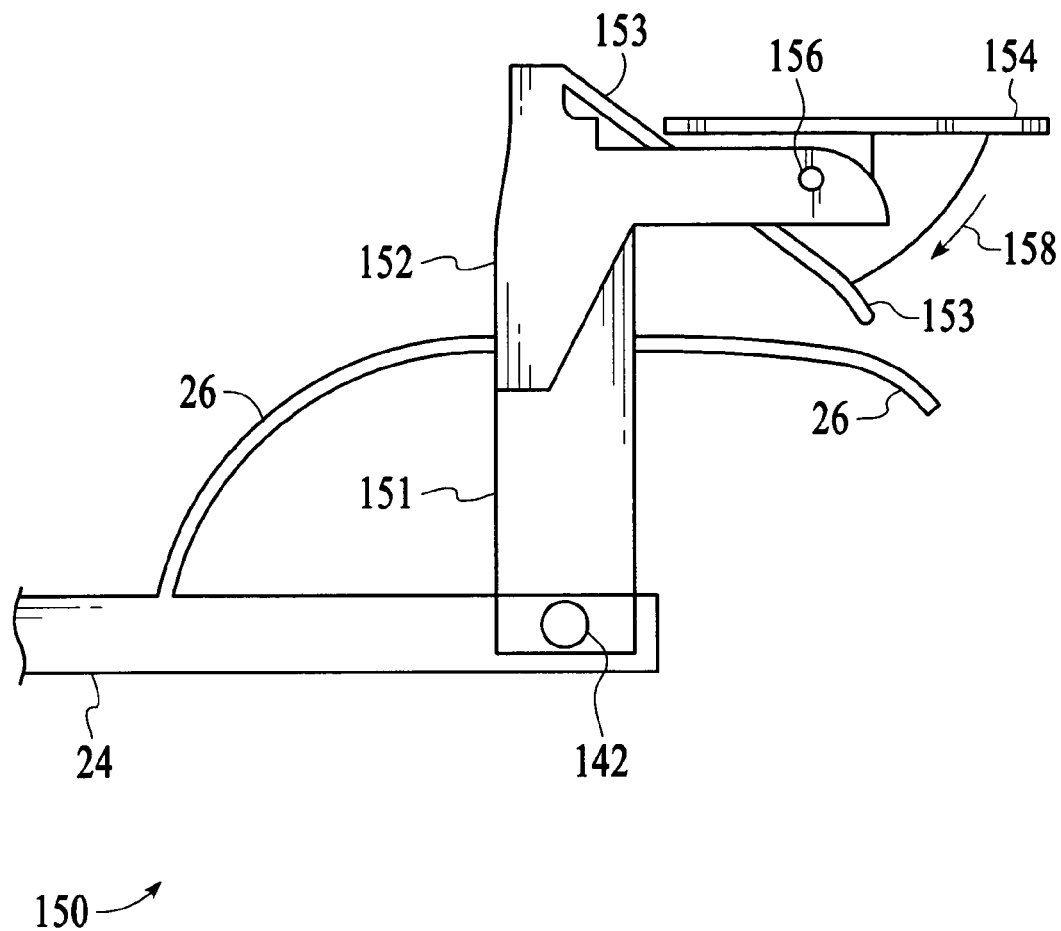
FIG. 16 shows a side view of a wheel with a brake installed thereupon.

FIG. 16 shows the wheels 26 with a brake assembly 150 installed thereupon. The brake 150 may be connected to the wheels 26 and the wheel support 24 by a number of commercially available fasteners, such as bolt, pin, screw, etc. Any number of commercially available brakes, such as bicycle type brakes may be employed. The brake assembly 150 employed in this invention includes the brake frame 151, brake extension 152, attached to the brake frame by welding or other attachment means, break tip 153 extending from the brake extension 152 to the proximity of the wheel 26 and break pedal 154 movably attached to the brake extension 152 by an axle 156. Pressing down onto the brake pedal 154 causes it to move downward in direction of the arrow 158 and pushing the brake tip 153 towards the wheel 26 and stopping the motion upon contact with the wheel 26. To release the brake 150 one pulls up on the brake pedal 154. This breaks the contact with the wheel 26 allowing the motion again. The entire sequence may be conveniently performed with one's shoe.

Figure 17:
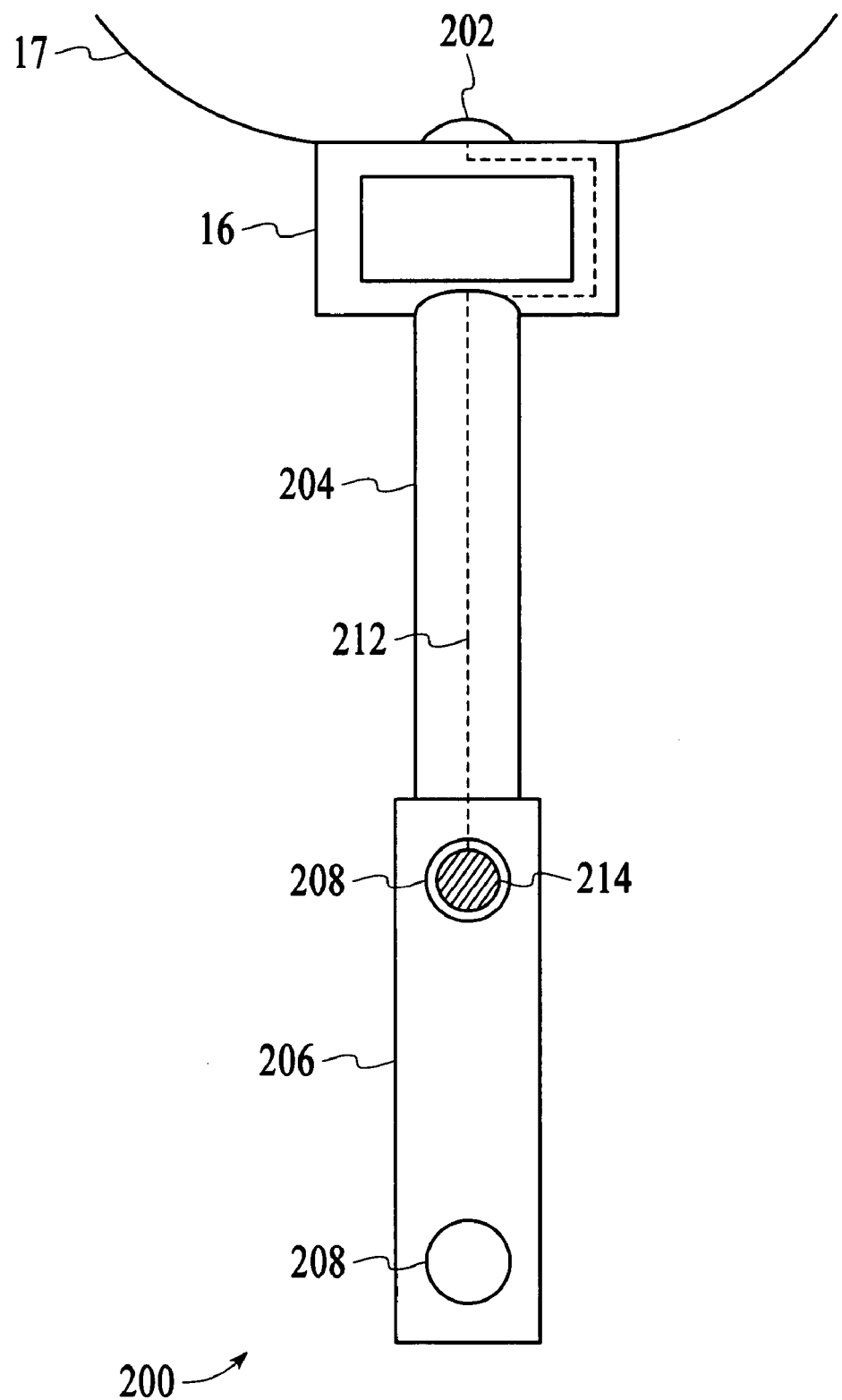
FIG. 17 is the front view of the handle for pulling or pushing the golf bag.

Shown in FIG. 17 is a front view of one version of a commercially available handle 200 for pulling the golf bag 10, where 16 is the grasping portion of the handle 200, 202 is the release activator of the handle 200, 204 is the extendable portion of the handle 200, 206 is the body of the handle 200, 208 are the clearance holes in the body of the handle 200, 214 is the extension from the extendable portion 204 designed to fit into the clearance holes 208, and 212 is the release mechanism connecting the release activator 202 with the extension 214. Preferably, the grasping portion 16 is level with the rim 17 of the golf bag 10.

Figure 18:
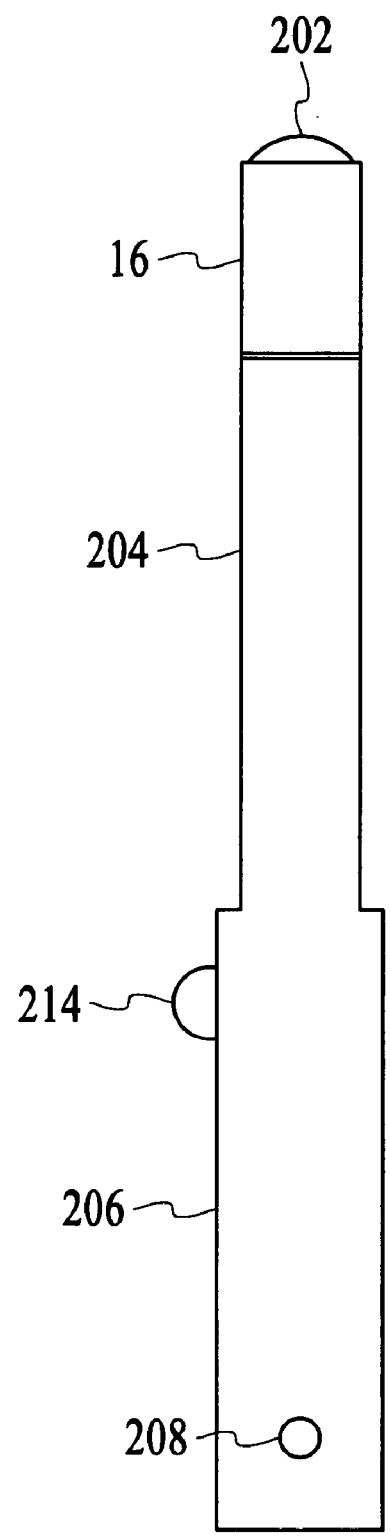
FIG. 18 is the side view of the handle of FIG. 17.

FIG. 18 is the side view of the handle of FIG. 17 in extended position showing the extension 214 fitting through the upper clearance holes 208.

Figure 19:
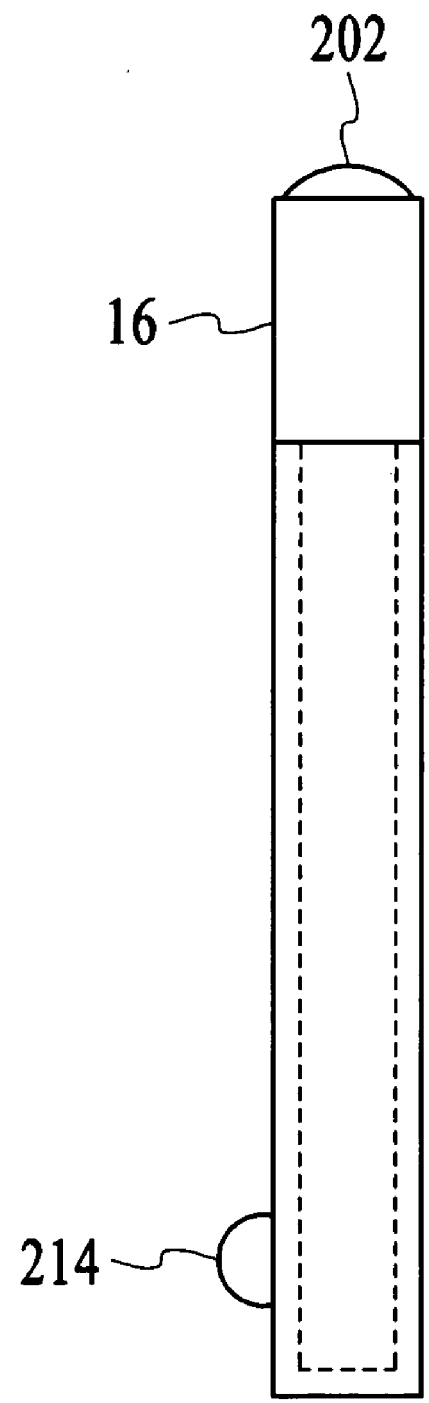
FIG. 19 shows the handle in its closed position.

FIG. 19 is the side view of the handle of FIG. 17 in retracted or closed position and showing the extension 214 fitting through the lower clearance holes 208. Pressing the release activator 202 activates the release mechanism 212 so that the extension 214 drops out of the lower clearance hole 208. This makes it possible to pull on grasping portion 16 until the extendable portion 204 reaches the upper clearance hole 208 and the extension 214 fits into the upper clearance hole 208, thus locking together the extendable portion 204 and the body 206. The handle 200 is now in its fully extended position and the bag 10 can easily be pulled or pushed. Pressing again on the release activator 202 and pushing downward on the extendable portion 204 causes the extension 214 to fit into the lower clearance hole 208 and the handle 200 is now in its retracted position.

Figure 20:
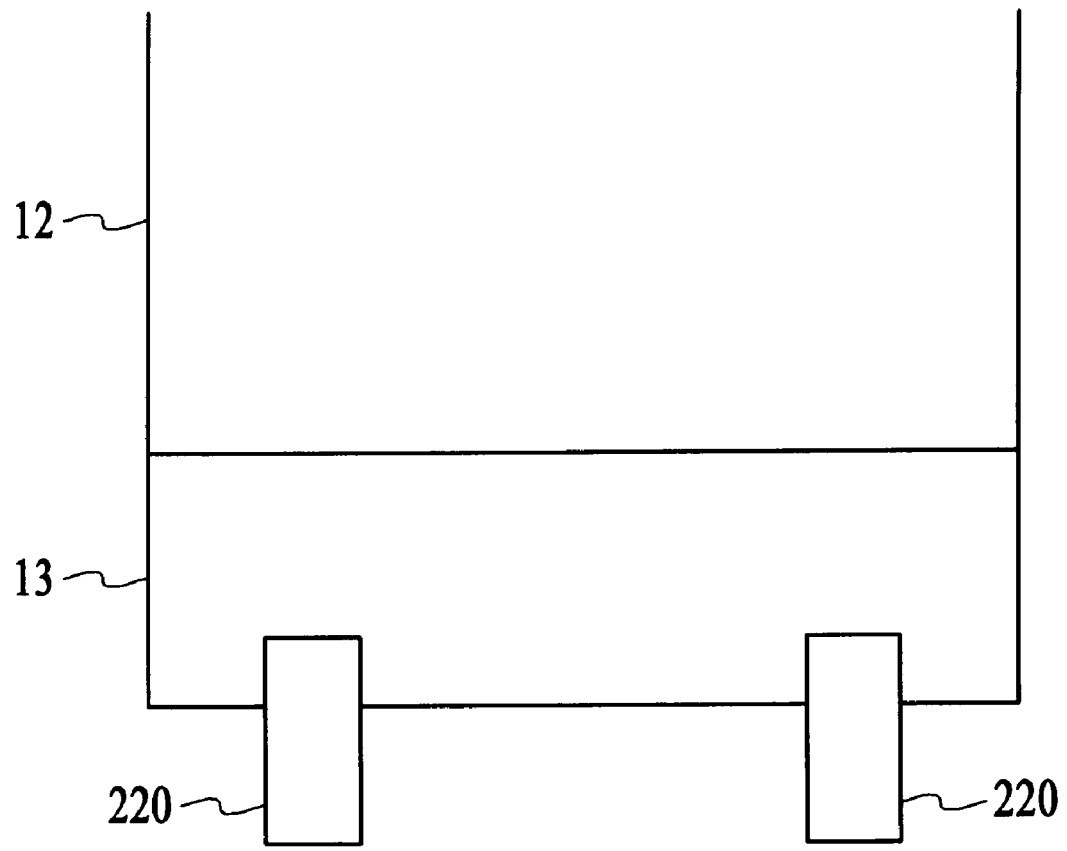
FIG. 20 shows the additional wheels installed on the front section of the golf bag bottom.

Another embodiment of the present invention is shown in FIG. 20 where one or more wheels 220 are added to the front section of the closed bottom 13, i.e., to the section of the closed bottom 13 opposite of the position of the reinforced surface 22. The wheel 220 is at the same level as the wheels 26 when in their extended position, making it possible to push the bag 10 in forward direction and generally aid the stability of the bag 10. Preferably, the wheel 220 is manufactured at the same time and by the same process as the closed bottom 13.

While the present invention has been described in detail in reference to the preferred embodiments, various modifications and substitutions can be made thereto without departing from the spirit and scope of the present invention as set forth in the appended claims.

What is claimed is:

1. A golf bag comprising:

a golf bag body with an open top and a rim around said open top, a closed bottom, a generally circular wall connecting said bottom and said rim and having an inner surface and an outer surface, an inner empty space adopted for receiving at least one golf club, and a reinforced region; said reinforced region having a first surface and a second surface; said first surface of said reinforced region coupled to said golf bag body; said second surface comprising at least one arcuate channel having a first end and a second end, said channel extending from said second surface and partially toward said first surface of said reinforced region, said arcuate channel describing an arc length of approximately 90 degrees; said reinforced region further comprising at least two depressions extending from said second surface and partially through said reinforced region in the direction of said first surface of said reinforced region; said depressions generally located at about 90 degrees to each other; said reinforced region further comprising an extension having a length and originating at said second surface of said reinforced region and extending generally vertically and away from said second surface of said reinforced region;

an external arm member being detachably and rotatably coupled at said at least one arcuate channel to said second surface of said reinforced region of said golf bag, said external arm member being of a geometric shape suitable for fastening and having a first and, second end, top surface, bottom surface, front surface and back surface; said length of said extension being longer than the thickness of said external arm member where said external arm member couples to said extension, said extension terminating in a surface adapted for receiving said external arm member; said external arm member being detachably and rotatably coupled to said exension;

a first wheel support and a second wheel support, said wheel supports having a first end and a second end, said first end of said first wheel support lockably coupled to said first end of said external arm member and said first end of said second wheel support lockably coupled to said second end of said external arm member; said wheel supports being movable in the direction of said external arm member and away from said external arm member by pivoting said wheel supports at the point where said wheel supports couple to said external arm member, and wheel members rotatably coupled to said second ends of said first and said second wheel supports.

2. The golf bag of claim 1 wherein said rotation is limited to about 180 degrees.

3. The golf bag of claim 1 wherein said surface of said extension further defines a void in said extension, said void being adapted for receiving a fastener for coupling said external arm member to said second surface of said reinforced region.

4. The golf bag of claim 1 wherein said depressions are located near said first end and said second end of said at least one arcuate channel.

5. The golf bag of claim 1 wherein said external arm member further defines at least two voids in the area coupled to said reinforced region, said first and said second voids extending through said external arm member and positioned to mate with said at least two depressions in said reinforced region.

6. The golf bag of claim 1 wherein said reinforced region is an integral part of said golf bag.

7. The golf bag of claim 3 wherein said fastener is a screw.

8. The golf bag of claim 3 further comprising a spacer fitted between said external arm member and said fastener, said spacer further defining a void therein for receiving said fastener.

9. The golf bag of claim 5 wherein one of said at least two voids further comprises a lockable spring loaded plunger coupled to said void, said spring urging said plunger in the direction of and extending through said external arm member and reaching into one of at least one depression in said reinforced region.

* * * * *